United States Patent [19]
Gentile et al.

[11] 3,879,257
[45] Apr. 22, 1975

[54] ABSORBENT UNITARY LAMINATE-LIKE FIBROUS WEBS AND METHOD FOR PRODUCING THEM

[75] Inventors: Victor R. Gentile, Brookhaven; Richard R. Hepford, Folcroft, both of Pa.; Nicholas A. Jappe, Claymont, Del.; Clifford J. Roberts, Jr., Turnersville, N.J.; Gunnar E. Steward, Media, Pa.

[73] Assignee: Scott Paper Company, Delaware County, Pa.

[22] Filed: Apr. 30, 1973

[21] Appl. No.: 356,052

[52] U.S. Cl. ............... 162/112; 156/183; 161/128; 161/146; 161/268; 264/283
[51] Int. Cl. ............................................. B31f 1/12
[58] Field of Search .......... 161/128, 129, 146, 148, 161/268; 156/183; 264/282, 283; 162/112, 184, 231, 135, 111

[56] References Cited
UNITED STATES PATENTS

| | | | |
|---|---|---|---|
| 2,960,089 | 11/1960 | Harwood et al. | 128/290 |
| 3,017,304 | 1/1962 | Burgeni | 161/123 |
| 3,059,313 | 10/1962 | Harmon | 156/183 |
| 3,396,201 | 7/1968 | Kalwaites | 161/124 |
| 3,759,775 | 9/1973 | Shepherd | 156/280 |
| R17,633 | 4/1930 | Rowe | 264/283 |

FOREIGN PATENTS OR APPLICATIONS

| | | |
|---|---|---|
| 1,071,191 | 6/1967 | United Kingdom |
| 1,311,619 | 3/1973 | United Kingdom |

*Primary Examiner*—George F. Lesmes
*Assistant Examiner*—Paul J. Thibodeau
*Attorney, Agent, or Firm*—R. Duke Vickrey; William J. Foley

[57] ABSTRACT

Disclosed is a unitary or single-ply fibrous web having a laminate-like structure which consists of a soft, absorbent central core region of relatively low fiber concentration sandwiched between two strong, abrasion-resistant surface regions of higher fiber concentration. The surface regions have bonding material, preferably elastomeric, disposed within to provide strength to the web. The more concentrated fibers in the surface region provide better capillary action to draw moisture into the web. The relatively low fiber concentration within the central core region provides space to increase the amount of moisture absorbable by the web. Within the central core region are networks of fibers connecting the two surface regions together generally without the use of bonding material extending entirely through the web. The bonding material in at least one surface region is disposed in a fine, spaced-apart pattern, and the bonded portions in that surface region are finely creped to soften them.

The method of the invention consists of forming a fibrous web, preferably of randomly oriented short fibers, applying to the first side of the web first bonding material which penetrates from about 10 to about 60 percent through the thickness of the finished web product, applying to the second side of the web second bonding material in a fine, spaced-apart pattern which penetrates from about 10 to about 60 percent through the thickness of the finished web product and which does not substantially connect with the first bonding material, adhering the web in a pattern to a creping surface with the second bonding material, and creping the web from the creping surface. The preferred form of the invention consists of applying bonding material in a fine, spaced-apart pattern to one side of the web, pattern adhering that side of the web to the creping surface with the bonding material, and creping the web from the creping surface, and then repeating those steps to the other side of the web.

34 Claims, 7 Drawing Figures

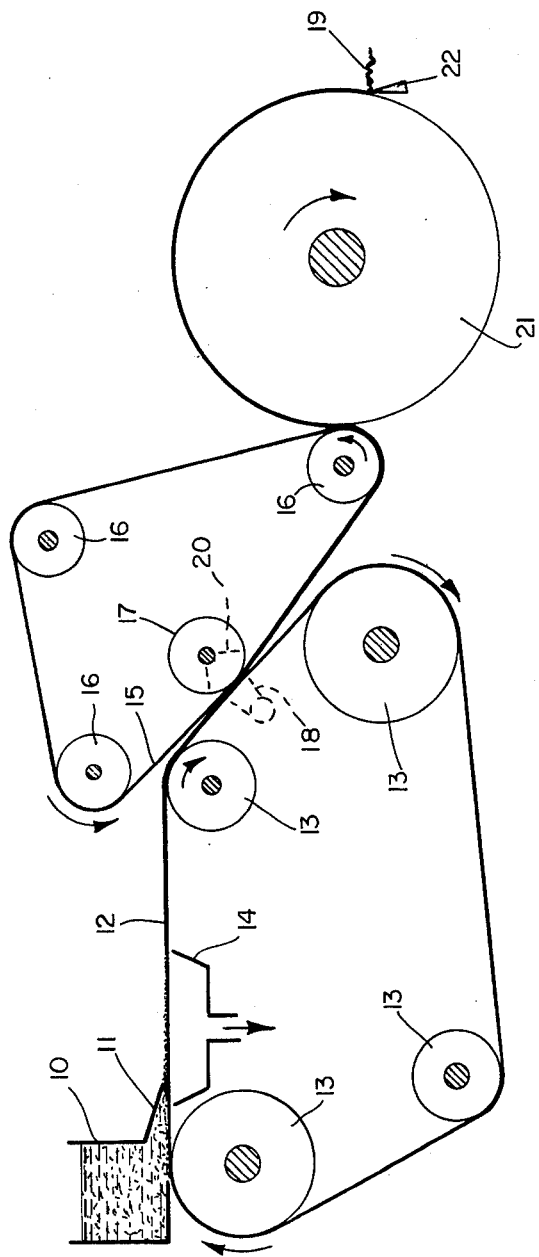
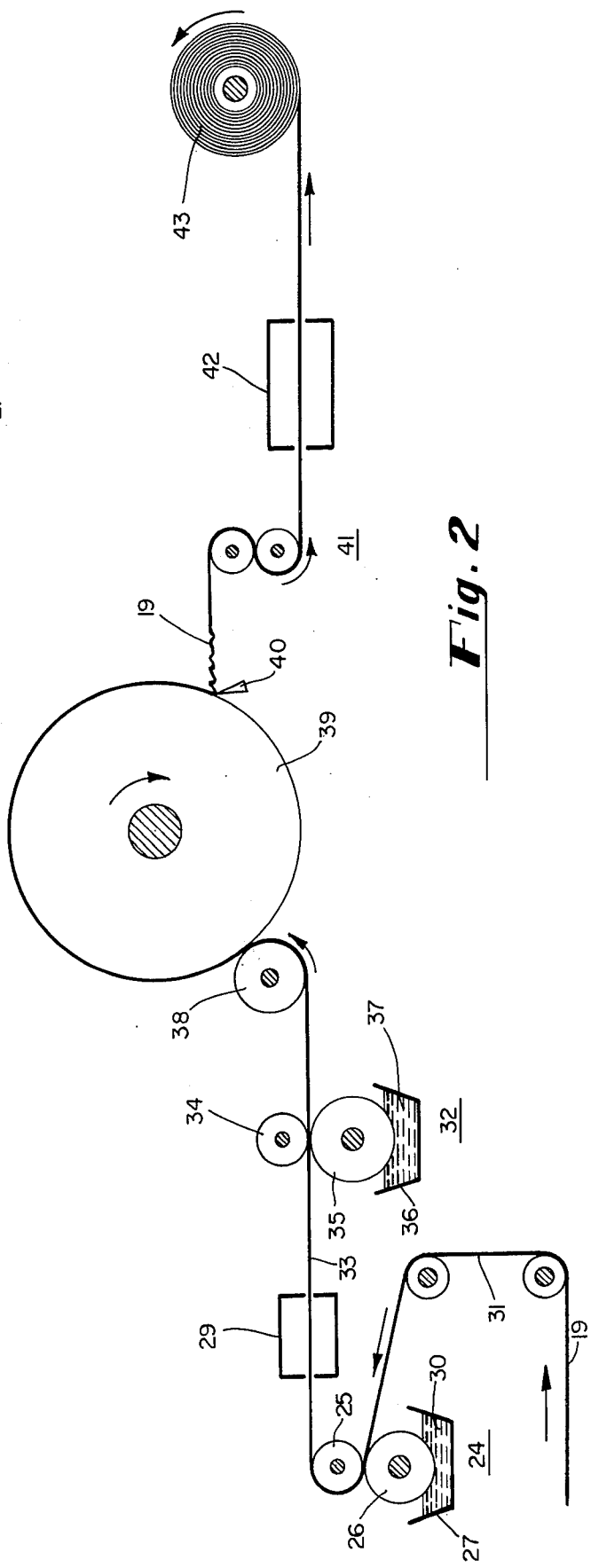
Fig.1
Fig.2

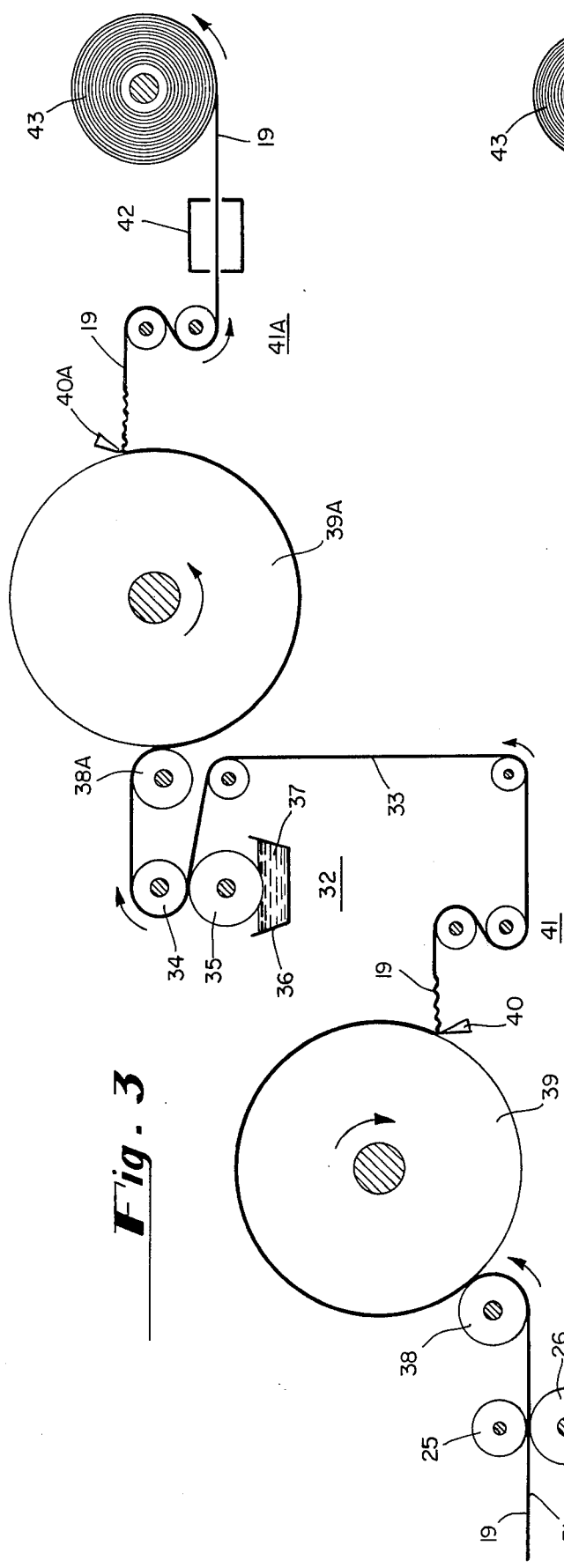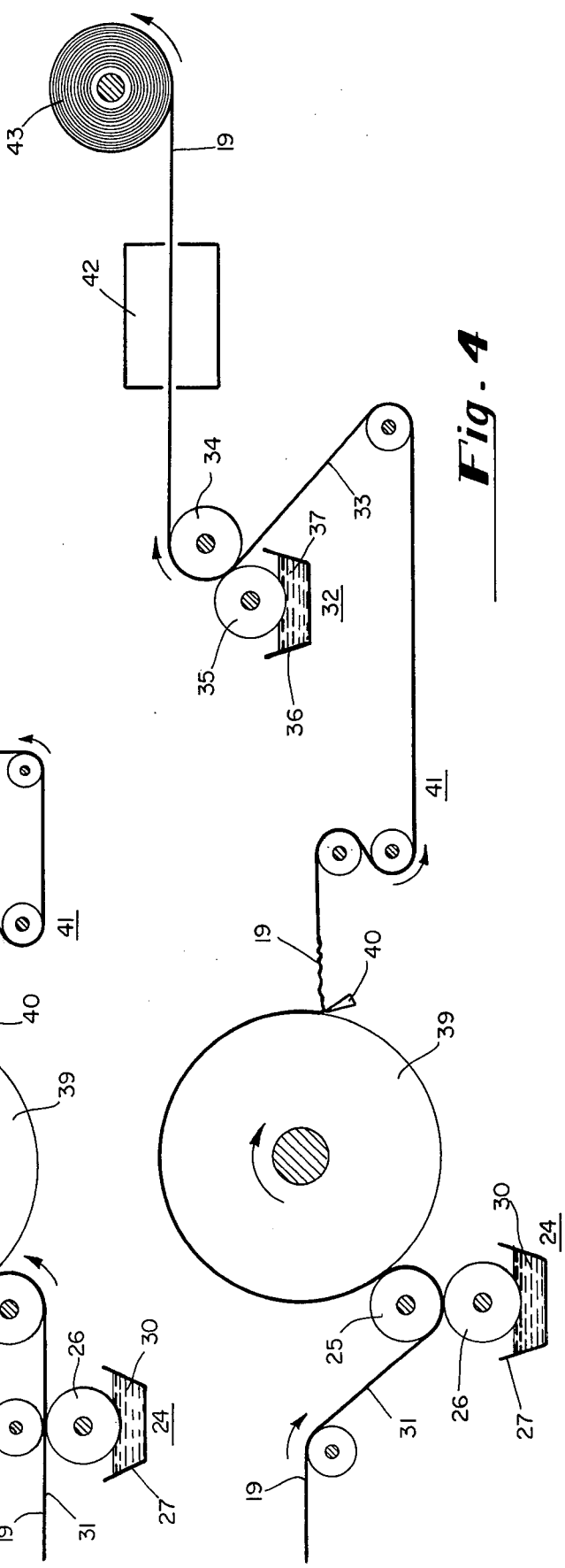

ABSORBENT UNITARY LAMINATE-LIKE FIBROUS WEBS AND METHOD FOR PRODUCING THEM

BACKGROUND OF THE INVENTION

1. Field of the Invention

This invention relates to an improved absorbent fibrous sheet material made preferably from predominately papermaking fibers, for use as sanitary disposable towels and wipers, and to a method for making it.

2. Description of the Prior Art

A strong trend exists in the paper industry to develop disposable products from papermaking fibers to serve as substitutes for conventional cloth products which are used as wipers and towels in both the home and industrial shops. To successfully gain consumer acceptance of these paper products, they must closely simulate cloth in both consumer perception and in performance. Thus, certain physical properties must be present in a successful product. These properties generally include softness, strength, stretchability, absorbency rate and capacity, ability to wipe dry, bulk and abrasion resistance. Depending upon the particular intended use of the product, some properties are more desirable than others.

Softness is one property which is highly desirable for almost all of the paper products regardless of their intended use. This is true not only because consumers find it more pleasant to handle soft feeling products, but also because softness enables the shape of the product to be readily conformable to the shape dictated by job requirements. Strength and the ability to stretch are two other properties which are desirable, particularly in those products which are to be used for heavy work duty. Also, it is desirable for the products to have good abrasion resistance if they are to be used for cleaning or scouring. If the primary function of the particular product is to wipe up spilled liquids, absorbency and the ability to wipe dry are two other properties which are highly desirable. And bulk is important not only because it enables the paper product to feel like cloth, but also because it is favorably interrelated to other desirable properties, such as softness and absorptive capacity.

Some of these properties are somewhat adversely interrelated to each other. That is to say, an increase in one property is usually accompanied by a decrease in another property. For example, an increase in web density (the concentration or closeness of the fibers to each other) increases the ability of the web to wipe dry or pick up moisture, due to the greater capillary action of the small spaces between the fibers. However, an increase in closeness of the fibers decreases the spaces between the fibers available for holding the moisture, and thus reduces the absorbtive capacity of the web.

Perhaps an even more demonstrative example of the adverse interrelation between properties is represented by the relationship between strength and softness. It has generally been believed that conventional methods employed to produce soft paper necessarily result in strength reduction. This is because conventional paper products are formed from aqueous slurries, wherein the principle source of strength comes from interfiber bonds formed by the hydrate bonding process associated with papermaking. Paper which has a heavy concentration of these papermaking bonds is usually stiff. To soften the paper, it is necessary to reduce these stiff bonds, an action which also results in a loss of strength.

The method most commonly employed to reduce the stiff papermaking bonds is to crepe the paper from a drying surface with a doctor blade, disrupting and breaking many of the interfiber bonds in the paper web. Other methods which have been used to reduce these bonds contrast with creping by preventing formation of the bonds, rather than breaking them after they are formed. Examples of these other methods are chemical treatment of the papermaking fibers to reduce their interfiber bonding capacity before they are deposited on the web-forming surface, use of unrefined fibers in the slurry, inclusion into the slurry of synthetic fibers not exhibiting the ability to form papermaking bonds, and use of little or no pressing of the web to remove the water from the paper web after it is deposited on the web forming surface. This latter method reduces formation of bonds by reducing close contact of the fibers with each other during the forming process. All of these methods can be employed successfully to increase the softness of paper webs, but only with an accompanying loss of strength in the web.

Attempts to restore the strength lost by reduction of papermaking bonds have included the addition to the web of bonding materials which are capable of adding strength to a greater degree than adding stiffness to the web. One method which has been used to apply bonding materials to the web is to add the bonding material to the aqueous slurry of fibers and deposit it on the web-forming surface along with the fibers. With this method, the bonding material can be distributed evenly throughout the web, avoiding the harshness which would accompany concentrations of bonding material. However, this method has the disadvantage of reducing the absorbency of the web by filling the pores between the fibers with bonding material. It also bonds the web uniformly throughout, the disadvantage of which will be explained subsequently.

Another method which has been used to apply bonding material to the web is to apply the bonding material in a spaced-apart pattern to the web. By this method, the majority of the web surface does not contain absorbency-reducing bonding material. This method is commonly employed in the field of nonwovens where little or no strength is imparted to the web by papermaking bonds, and almost all of the strength is obtained from the bonding materials. (Some of the strength may be obtained from intertwining of fibers, where the fibers are long enough to do so.) However, the fibers in such nonwoven webs are sufficiently long to enable small amounts of bonding material to impart substantial strength to the web, because adjacent areas of the bonding material in the spaced-apart pattern can be quite far apart and yet be able to bond each fiber into the network.

In contrast to nonwoven webs, webs made entirely or principally from papermaking fibers require bonding areas to be quite close together because papermaking fibers are very short, generally less than one-quarter of an inch long. Thus, it has been thought that to apply sufficient bonding material in a pattern to a paper web to the degree necessary to bond each fiber into the network would result in a harsh sheet, having poor softness characteristics, particularly in the areas where the bonding material is located.

A method has been discovered which reduces the harshness in the web area where the bonding material is concentrated. That method is disclosed in U.S. Pat. application Ser. No. 156,327 and, in its preferred form, consists of first forming a fibrous web under conditions which result in very low interfiber bonding strength by one of the previously described methods. Strength is then imparted to the web by applying bonding material to one surface of the web in a fine spacedapart pattern. The harshness in the bonded areas is reduced by tightly adhering bonded portions of the web to a creping surface and removing with a doctor blade, thus finely creping the bonded portions to soften them. This form of controlled pattern creping also results in a number of other property improvements. For example, selective creping of the bonded areas in the surface of the web creates contraction of the surface of the web in all directions, resulting in an increase in stretch in both the machine direction and the cross-machine direction of the web. Also, the portions of the web where the bonding material is not located are generally disrupted by the creping action, resulting in an increase in bulk of the web, an increase in the softness of the web, and an increase in absorbency. At certain locations within the web, generally close to the bonding material locations, the web may develop internal split portions which further enhance the absorbency, softness, and bulk of the web. This effect does not occur, at least to the same extent, in the web formed by addition of bonding material to the aqueous slurry of fibers.

The "156,327" method produces a paper web with outstanding softness and strength, two properties which were previously believed to be almost mutually exclusive in paper webs. It also produces a web with excellent absorbency properties due to the bonding material being confined to only a portion of the web surface. Furthermore, the compaction of the surface fibers due to the shrinkage of the areas containing bonding material upon being finely creped creates one surface of the web which has improved wipe-dry characteristics. It is also believed that pressing the web to the creping surface while the web has moist portions in the surface region due to the uncured or undried bonding material causes the fibers in those moist areas to compact.

This method is particularly useful in production of webs in a lower basis weight range for such use as bathroom tissues. However, it has shortcomings in making webs for heavier duty use such as for towels where greater strength, bulk and absorbency is desired. Examples of such shortcomings are poor abrasion resistance on the nonbonded side of the web and less strength than may be desired. Both of these properties could be improved by causing the bonding material to penetrate completely through the web to create a network of bonding material on both sides of and entirely through the web, but it has been found that the web would be less subjected to the improvements in the properties afforded by practice of the 156,327 invention. For example, bonding the web with the bonding material extending completely through the web would greatly reduce the disruption of the fibers within the web upon creping, and therefore, result in a reduction of bulk, softness, and absorbency. Also, complete penetration of the bonding material through the web is difficult to accomplish on heavier basis weight webs and attempts to do so result in concentrations of excess bonding material at the web surface where much of it is ineffective for strengthening interfiber bonds. Furthermore, if complete penetration of the bonding material does result, the bonding material in the interior of the web will not be as efficiently used to increase abrasion-resistance of the web as when it is placed only in the surface of the web. Placement of the bonding material in the interior of the web is not only an inefficient use of the expensive bonding material, but results in harsher feel to the web due to the inability of the creping action to soften the bonded portions as effectively.

Also, one desirable feature of the 156,327 invention which would be reduced by bonding completely through the web is the ability to create on both sides of the web a web surface of compacted fibers having good wipe-dry characteristics while at the same time creating a bulky web capable of absorbing a large amount of moisture. These properties are only of minor importance when producing a product for such uses as bathroom tissues, but where the product is to be used for wipers or towels, it is very important. This shortcoming, in addition to the poor abrasion-resistance on one side of the sheet, detract from the 156,327 invention as a method of producing a wiper or towel product, especially one which requires considerable work abuse.

Probably the most commonly employed method to produce a wiper-like paper product having the desirable bulk, absorbency, and abrasion-resistance, is to laminate two or more embossed conventional paper webs together with an adhesive. One advantage of this method is that the tightly compacted fibers of the conventional paper webs offer good wipe-dry properties on both sides of the sheet while at the same time, the void spaces between the webs created by the embossments spacing the webs from each other increase the ability of the web to hold moisture. Examples of this method are disclosed in U.S. Pat. No. 3,414,459 and 3,556,907. The disadvantages of this method are apparent when considering the complex process involved in separately embossing two or more webs and then bringing them together with synchronism to prevent complete nesting of the embossed protuberances of one web into the embossed protuberances of the other web. Also, any given length of the multi-ply product requires initial production on a papermaking machine of a web two or more times as long. It is also apparent that the adhesive used to interconnect the plies to each other will present unpleasant stiffness at the location where the adhesive is disposed. Furthermore, prior art multi-ply paper products have generally been made from conventional paper webs which depend almost entirely upon stiff papermaking bonds for their strength.

Notwithstanding these shortcomings, multi-ply paper products are quite desirable in that they can be made very bulky compared to their weight, due to the void spaces between the plies created by the embossed protuberances holding the plies apart from each other. Because of this construction, multi-ply products are easily compressed between the fingers of the consumer, thereby aiding in giving some feeling of softness.

A consideration of the advantages of multi-ply products and the disadvantageous harshness of prior art multi-ply products would suggest making a multi-ply product by laminating two or more webs produced by the method disclosed in U.S. Pat. application No. 156,327. However, the prior art methods of laminating multiple plies of webs together involve the undesirable requirements of a complex laminating process, the need to produce two or more times as much base web and the unpleasant stiffness resulting from the use of adhesive to bond the webs together, all reducing the advantages of such a suggested product.

From the foregoing discussion, it can be seen that it would be very desirable and is, therefore, an object of the invention to produce a paper product which has the bulk, absorbency, and compressability of a conventional multi-ply paper product, but without the usual accompanying lack of softness due to the use of stiff adhesive to bond the plies together and to their dependence upon papermaking bonds for strength. It would also be very desirable and is, therefore, an object of the invention to produce a paper product with the desirable properties of a multi-ply product without the disadvantages of the complex process necessarily employed in the prior art, nor the accompanying economic disadvantages. These objects are accomplished in the product of the invention produced by the method of the invention.

SUMMARY OF THE INVENTION

The product of the invention is a soft, absorbent, fibrous unitary or single-ply fibrous web having a laminate-like structure which is similar to that of multi-ply webs. The web preferably has a basis weight from about 20 to about 100 pounds per ream of 2880 square feet (based upon bone dry fiber weight) and has three laminate-like regions: strong, abrasion-resistant surface regions on both sides of the web, each of which has relatively close fiber concentration, increasing wipe dry properties of the web; and a soft central core region sandwiched between the two surface regions and having relatively low fiber concentration, and preferably caverns, increasing the softness, compressibility and absorbtive capacity of the product.

Each surface region has bonding material, which is preferably elastomeric, disposed throughout to bond the fibers into a strong network and impart abrasion resistance to both sides of the web. On at least one side of the web, and preferably on both, the bonding material is disposed in a fine, spaced-apart pattern leaving a substantial portion of that surface, preferably at least 40 percent and more, and more preferably 50 percent or more, without bonding material, thus providing very absorptive areas through which moisture can readily pass into the interior of the web.

The central core region of the web in the preferred form of the invention consists of a soft, relatively low density network of fibers held loosely together by papermaking bonds. In some embodiments, additional strength or even the sole strength may be imparted to the central region by the intertwining of relatively longer synthetic fibers added to the fiber mixture in a minor portion. And in other embodiments the web may consist entirely of relatively longer synthetic fibers. The central region preferably has split portions or caverns disposed at spaced locations throughout, providing greater bulk, softness and absorbency to the web. Separating the split portions from each other are networks of fibers connecting the surface regions together, in a manner to be compared to the embossed protuberances of the multi-ply webs of the prior art, but generally without the use of undesirable stiff adhesives.

The web has an undulating disposition due to controlled pattern creping of the web through use of the patterned applied bonding material as a creping adhesive. The controlled pattern creping increases the web's bulk and absorbency, as well as its softness and compressibility. It also finely crepes the areas in the surface region of the web where the bonding material is disposed and has been used to pattern adhere the web to the creping surface. "Fine creping" as the term is used in the specification and claims, is the resulting creping effect which occurs to the portions of a web held tightly to a creping surface with adhesive. It may manifest itself in the adhesively adhered portions in greater foreshortening and/or greater number of creping wrinkles and/or greater degree of softening than would have been obtained by creping of the same portions of the web without the use of adhesive. Where the fine creping is confined to a pattern on the web, as it is in the invention, it causes the creping effect on the entire web to be predominately concentrated in the areas of the web which are adhesively adhered to the creping surface, and thus, produces a patterned crepe.

The bonding material is disposed only part way through the web, preferably between 10 and 40 percent of the finished web thickness on each side, to enable the controlled pattern creping to produce maximum process improvements of bulk, softness and absorbency and to provide the most efficient use of the bonding material. In some embodiments of the web, the bonding material is disposed between 10 and 60 percent through the finished web product on both sides of the web, but, in such embodiments, either because of the particular patterns in which the bonding materials are applied, or because of the bonding material penetrating much less on one side of the web than on the other, the bonding material in one surface is substantially unconnected to the bonding material in the other surface. Surprisingly, it was found that disposing the bonding material on both sides of the web without complete penetration of the bonding material through the web or connection of bonding material from one side with that of the other enabled the development of greater bulk increase from equal amounts of controlled pattern creping and greater strength than obtainable with the same amount of bonding material applied from one side only and completely penetrating the web. In a preferred embodiment formed from an aqueous slurry of principally papermaking or lignocellulosic fibers, the web has preferably been treated prior to application of the bonding material to reduce the interfiber bonding of the lignocellulosic fibers created by papermaking bonds.

The method of the invention consists of:

forming a fibrous web preferably having a basis weight from about 16 to about 80 pounds per ream of 2880 square feet, and preferably from an aqueous slurry of principally lignocellulosic fibers under conditions which reduce interfiber bonding;

applying bonding material, preferably elastomeric, to the first surface of the web, preferably in a fine pattern of spaced portions occupying preferably from about 15 percent to about 60 percent of the surface area of the web, to provide strength to the web and abrasion resistance to that surface, the bonding material being applied so that is penetrates into the web preferably from about 10 to about 40 percent of the finished web product thickness, applying bonding material, preferably elastomeric, to the second surface of the web in a fine pattern of spaced portions preferably occupying from about 15 to about 60 percent of the surface area of the web to provide additional strength to the web and abrasion resistance to that other surface, the bonding material being applied so that it penetrates into the web preferably from about 10 to about 40 percent of the finished web product thickness;

adhering the portions of the web containing bonding material on the second side of the web to a creping surface, the bonding material being used as the adhering agent; and creping the web from the creping surface with a doctor blade to greatly disrupt the fibers within the web where bonding material is not disposed, thereby increasing softness, absorbency, and bulk of the web, and finely creping the bonded portions of the web to soften them.

Variations to this method include creping the web twice, once immediately after applying the bonding material to the first surface and again immediately after applying bonding material to the second surface. This variation produces the preferred form of the product of the invention. Another variation to the method, and one less preferred, includes creping the web immediately after applying the bonding material to the first surface and not creping the web after applying bonding material to the second surface.

Another variation can be practiced in the penetration of the bonding material by penetrating the bonding material on one side of the web up to 60 percent of the finished web product thickness while permitting penetration of the bonding material on the other side to a reduced depth so as to substantially avoid the two applications of bonding material from connecting to each other. Also, deeper penetration, up to 60 percent on both sides can be practiced if the patterns on the two sides are so chosen or so displaced from each other that the two applications of bonding material do not substantially interconnect.

The product produced by this method is unique in its combination of desired qualities for a wiper product. The soft, central core region provides exceptional bulk per basis weight of the web, in addition to outstanding softness and absorbency. The surface regions of the web provide excellent strength, abrasion resistance, and wipe-dry properties. However, the bonding material in at least one of the surface regions is disposed in a spaced-apart fine pattern which provides strength to the web, but permits the fibers in areas of the surface region not having bonding material to provide a softer and more absorbent web surface. The controlled pattern creping of the web softens the bonded regions in the surface and at the same time provides good stretch in the web in both the machine direction and cross-machine direction. Because the bonding material is disposed generally close to the surfaces of the web and does not penetrate entirely through the interior of the web, the web can be split internally in scattered areas throughout the central region of the web to form void pockets between the web surfaces close to the location of the bonding material. By applying bonding material to both web surfaces in a pattern and creping from each side, as in the preferred embodiment, the creping effect on the web is increased to a greater extent than with applying bonding material and creping on one surface only, even though the total amount of creping is equal for both practices. Furthermore, the effect of the bonding material on both of the surfaces increases the web splitting in the central core region of the web greatly, particularly where two bonded regions are immediately opposite each other. The splitting effect of the creping can be controlled by the pattern of the bonding material disposition to provide sufficient fiber networks remaining in the central core region to satisfactorily interconnect the two surfaces of the web together.

BRIEF DESCRIPTION OF THE DRAWINGS

FIG. 1 is a schematic side elevation view of one form of apparatus for forming a fibrous web suitable for treatment by the method of the present invention to form the sheet material of the invention;

FIG. 2 is a schematic side elevation view of a portion of one form of apparatus for carrying out the method steps of the invention;

FIG. 3 is a schematic side elevation view of a portion of the preferred form of apparatus for carrying out the preferred method steps of the invention;

FIG. 4 is a schematic side elevation view of a portion of another form of apparatus for carrying out the method of the invention;

DESCRIPTION OF THE PREFERRED EMBODIMENTS

Figure 5:
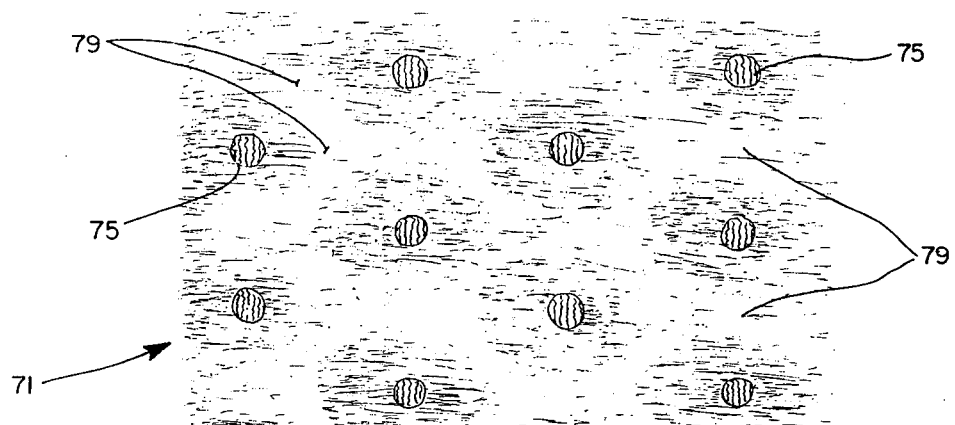
FIG. 5 is a greatly enlarged planar view of a portion of one side of the sheet material of the invention to which bonding material was applied in one form of pattern.

FIG. 1 schematically illustrates a papermaking machine which is capable of forming a web to which the method steps of the present invention are applied. A head box 10 is provided to hold a supply of fiber furnish, which generally comprises a dilute slurry of fibers in water. The head box 10 has slice lips 11 disposed over the moving surface of a condenser 12, which in this embodiment comprises a foraminous woven wire such as a Fourdrinier wire. The fiber furnish in head box 10 issues from the slice lips 11 onto the surface of the wire 12. The wire 12 is carried through a continuous path by a plurality of guide rolls 13, at least one of which is driven by drive means (not shown). A vacuum box 14 is disposed beneath the wire 12 and is adapted to assist in removing water from the fiber furnish in order to form a web from the fibers. In addition, other water removal means such as hydrofoils, table rolls, and the like (not shown) may be employed beneath the upper flight of the wire 12 to assist in draining water from the fiber furnish. Upon nearing the end of the upper flight of the Fourdrinier wire 12, the web is transferred to a second carrying member 15, which may be either a wire or a felt. This second carrying member 15 is similarly supported for movement through a continuous path by a plurality of guide rolls 16.

The transfer of the web from wire 12 to member 15 can be accomplished by lightly pressing the carrying member 15 into engagement with the web on the wire 12 by a pickup roll 17. The web transfer from wire 12 to member 15 may be accomplished or assisted by other means such as an air knife 18 directed against the surface of wire 12 opposite the web, or a vacuum box 20 within the pickup roll 17, or both, such means being well known to those skilled in papermaking techniques. At least one of the rolls 16 or 17 supporting the second carrying member 15 is driven by means (not shown) so that member 15 has a speed preferably equal to the speed of the wire 12 so as to continue the movement of the web.

The web is transferred from member 15 to the surface of a rotatable heated dryer drum 21, such as a Yankee dryer. The web is lightly pressed into engagement with the surface of the dryer drum 21 to which it adheres, due to its moisture content and its preference for the smoother of two surfaces. In some cases it may be desirable to apply a creping adhesive, such as animal glue, uniformly over the web surface or drum surface. As the web is carried through a portion of the rotational path of the dryer surface, heat is imparted to the web, and generally most of the moisture therein is removed by evaporation. The web 19 is removed from the dryer surface in FIG. 1 by a creping blade 22, although it could be removed therefrom by peeling it off without creping, if this were desired.

Drying may be accomplished by drying means other than the dryer drum 21. Thus, the dryer may take a substantially different form, such as that shown in U.S. Pat. No. 3,432,936. This type of dryer accomplishes the removal of moisture from the web by passing air through the web to evaporate the moisture without applying any mechanical pressure to the web. This latter feature can be advantageously used in connection with the present invention for a number of reasons set forth below. In addition, a web which is dried in this manner is not usually creped, and this may be a desirable feature in certain instances.

At this point, regardless of the particular apparatus or process utilized, a web is formed which can be treated in accordance with the method of the present invention to form a sheet material of the present invention. The web preferably comprises principally lignocellulosic fibers like wood pulp or cotton linters used in papermaking which are short fibers of less than one-fourth inch length. However, the web may be formed with a portion or all of the fibers being relatively longer fibers and still retain advantages of the present invention. Examples of such relatively longer fibers are cotton, wool, rayon, regenerated cellulose, cellulose ester fibers such as cellulose acetate fibers, polyamide fibers, acrylic fibers, polyester fibers, vinyl fibers, protein fibers, fluorocarbon fibers, dinitrile fibers, nitrile fibers, and others, natural or synthetic. The length of these other fibers may be up to about 2½ inches long, although shorter lengths are advantageous in forming the web on conventional papermaking equipment. A particularly desirable product can be produced from a combination of papermaking fibers and from about 10 to 15 percent short rayon fibers. The web may also be dry formed such as on conventional air lay equipment using a combination of papermaking fibers and relatively longer synthetic fibers, or either alone. It is particularly advantageous for economic and other reasons to use at least 50 percent papermaking fibers. And it is also particularly advantageous for the fibers to be randomly oriented rather than aligned.

The web 19 preferably has a basis weight such that in the finished web product the basis weight will be between about 20 and about 100 pounds, and more preferably between about 25 and about 60 pounds per 2880 square feet. This means that the web 19, upon being formed into a base web, should have a basis weight between about 16 and 80 pounds, and more preferably between about 22 and about 45 pounds per 2880 square feet, in practicing the preferred forms of the invention. It is sheet products in this general range which benefit most from the method of the invention since they are largely used where the features of the invention are important. And it is in this range of basis weights where the process is most successful in imparting the desired properties to the invention.

In the preferred embodiments of the present invention, the web at this point, that is, just prior to being subjected to the process steps of the invention, preferably possesses certain physical characteristics so that when it is treated by subsequent steps of the method of the invention, it is transformed into a sheet material of superior properties. Broadly described, these characteristics possessed by the web to be treated are all evidenced by a reduced amount of interfiber bonding strength in the web. The effect of such reduced interfiber bonding strength is to substantially alter a number of characteristics of the web when subjected to the process of the invention, for example, the bulk and softness of the web as well as the overall strength of the web.

Thus, although any fibrous web may be advantageously treated by the method of the present invention to create a softer, stronger, and generally bulkier web, the preferred form of sheet material of the present invention is made by treating webs which initially are relatively soft, bulky and quite weak. All of these properties are generally possessed by a web which has low interfiber bonding strength. The method of the present invention then imparts an improved combination of softness, bulk, absorbency, and strength to such webs.

Webs formed by deposition of dry fibers upon a forming surface, such as by conventional air laying techniques, will be relatively weak and soft, particularly if the fibers are too short to intertwine among themselves. However, conventionally formed paper webs are generally stronger than desired for practicing the preferred form of the invention and should preferably have their interfiber bonding strength reduced. This reduced interfiber bonding strength can be achieved in several ways. Thus, in some instances, the web is creped, perhaps during its removal from the Yankee dryer 21 as shown in FIG. 1. Such a web is characterized by good softness and bulk characteristics due to the large number of interfiber bonds which are disrupted or broken during the creping operation. Such a web is also relatively weak and has good stretch characteristics, at least in the machine direction if conventionally creped and perhaps in the cross-machine direction if creped successively in different directions, as is well known in the art.

In other instances, the fibers utilized to form the web 19 may be treated to reduce their bonding by such means as use of unrefined fibers or addition to the slurry of synthetic fibers which do not form papermaking bonds. Also, the fibers can be treated with a chemical debonder placed either in the fiber furnish, or prior to the addition of the fibers to the furnish, or even after formation of the web but prior to drying, such as when the web is carried on the wire 12. Such chemical debonders are commonly used to reduce the number of sites along the individual fibers which are susceptible to interfiber bonding of the type utilized in papermaking.

Debonding agents which may be used for this purpose include the cationic debonding agents disclosed in U.S. Pat. No. 3,395,708, that is, substances within the class of long chain cationic surfactants, preferably with at least twelve carbon atoms and at least one alkyl chain, such as fatty dialkyl quaternary amine salts, mono fatty alkyl tertiary amine salts, primary amine salts, and unsaturated fatty alkyl amine salts; the cation-active tertiary amine oxides disclosed in U.S. Pat. No. 2,432,126; and the cation-active amino compounds disclosed in U.S. Pat. No. 2,432,127.

In combination with any of the methods described above, or alone, interfiber bonding strength is further reduced if the web is formed under conditions of reduced pressing while it is wet. That is, the web is not subjected to significant compression between two elements or surfaces until it is substantially dried (preferably at least 80 percent dry). Thus, contrary to typical papermaking techniques, wherein a pick-up roll is used to press a felt into engagement with a web on a wire to transfer the web from the wire to the felt, this transfer may be accomplished by the use of air or vacuum or both. The alternative arrangement shown in phantom lines in FIG. 1 illustrates the manner in which this can be accomplished.

The use of any of these systems accomplishes web transfer without the application of pressure in any substantial amount to the web. Consistent with these systems, the web should not be pressed while wet into engagement with a surface of the Yankee dryer by means such as a pressure roll, a step commonly done on conventional papermaking machines, but rather drying should be accomplished through the use of air flowing over or through a web as by the transpiration drying process disclosed in U.S. Pat. No. 3,432,936. The fibers forming the web are therefore not pressed into intimate engagement with one another while the web is wet, and the number of contact points between fibers is reduced resulting in a reduction of interfiber bonding strength. Such conditions of reduced pressing are preferably maintained until the web is substantially dried so that few interfiber bonds are formed.

Of course, the foregoing clearly indicates that a press section, such as is conventionally used to extract moisture from a freshly formed web prior to thermal drying, should not be employed when performing the reduced wet pressing method of the invention. Such a press section would result in substantial compaction of the web, thereby increasing the number of interfiber bonds and the resulting interfiber bonding strength of the web when it is dried.

The best web softening results are obtained when the fibers in the web are treated with a chemical debonder, or when the web is formed under conditions of little or no pressing while it is wet, or when a combination of the above conditions is present, and then creping the web. This is believed to be due to the fact that creping has a very substantial bulking effect on webs which have very low interfiber bonding strength. Since bulk and softness are properties which the method of the present invention is utilized to obtain, it is desirable to optimize those properties in the web prior to treatment by the method of the present invention in order to enable them to be even further improved. But, regardless of the particular form of the web, treatment by the method of the present invention will enhance the bulk, softness and strength properties and impart substantial stretch to it in all directions in its own plane, in addition to improving other properties desirable in a wiper product.

FIGS. 2, 3, and 4, illustrate three alternative forms of apparatus for carrying out the method of the present invention. Referring to FIG. 2, one form of apparatus for performing the method of the invention is illustrated. In this apparatus, the web 19, which may have been formed on the apparatus illustrated in FIG. 1, or by other means previously described, is passed through the first bonding-material application station 24. This station 24 includes a nip formed by a smooth rubber press roll 25 and a patterned metal rotogravure roll 26. The lower transverse portion of the rotogravure roll 26 is disposed in a pan 27 containing a first bonding material 30. The rotogravure roll 26 applies in its engraved pattern bonding material 30 to one surface 31 of the web 19 as the web 19 passes through the nip. The web 19 may be passed through a drying station 29 where the adhesive is dried or set sufficiently to prevent it from sticking to the press roll in the next bonding-material application station. The drying station 29 consists of any form of heating unit well known in the art, such as ovens energized by infrared heat, microwave energy, hot air, etc.

The web 19 then passes through a second bonding-material application station 32 where bonding material is applied to the opposite side 33 of the web 19. The second bonding-material application station 32 is illustrated by smooth rubber press roll 34, rotogravure roll 35, and pan 36 containing a second bonding material 37. This bonding material is also applied to the web 19 in a pattern arrangement, although not necessarily the same pattern as that in which bonding material is applied to the first side 31. Even if the two patterns are the same, it is not necessary to register the two patterns to each other.

The web 19 is then pressed into adhering contact with the creping drum surface 39 by the press roll 38, and the second bonding material 37 causes only those portions of the web 19 where it is disposed to adhere tightly to the creping surface 39. The web 19 is carried on the surface of the creping drum 39 for a distance and then removed therefrom by the action of a creping doctor blade 40, which performs a conventional creping operation on the bonded portions of the web 19. That is, it imparts a series of fine fold lines to the portions of the web 19 which adhere to the creping surface 39. At the same time, the creping action causes the unbonded or lightly bonded fibers in the web to puff up and spread apart, forming shaped web portions having excellent softness and bulk characteristics. The extent and form of this type of crepe is controlled in part by the pattern in which the web is adhered to the creping drum 39 and the pattern of the bonding material on the opposite side 31 (the side away from drum 27) of the web. The creping surface 39 can be provided by any form of surface to which the bonding adhesive will tightly adhere to enable creping of the web 19 from the surface 39. Preferably, the creping surface 39 is heated to increase the adhesion of the web to the drum and to dry the web. An example of a suitable creping surface is a Yankee dryer.

The web 19, having been controlled creped, is pulled from the creping doctor blade 40 through a pair of driven pull-rolls 41 which control the degree of crepe by the difference in their speeds and the speed of the creping surface. The web 19 is then optionally passed through a curing or drying station 42 to cure or dry the bonding material on both sides of the web 19, if further curing or drying is required. The curing or drying station 42 may be of any form well known by those skilled in the art, such as those forms described for drying station 29. After passing through the curing or drying station 42, the web 19 is wound into a parent roll 43 by conventional winding means (not shown). It may then be transferred to another location to cut it into commercial size sheets for packaging.

FIG. 3 illustrates an apparatus for performing the preferred method of the invention. In this apparatus, the web 19, which may have been formed on the apparatus illustrated in FIG. 1, or by other means previously described, is passed through the first bonding-material application station 24, which may be of the same type illustrated in FIG. 2, and where first bonding material 30 is applied to the first side 31 of the web 19 in a fine pattern corresponding to the pattern of the rotogravure roll 25. Without drying or curing the bonding material, the web 19 is then pressed into adhering contact with creping drum surface 39 by the press roll 38. The bonding material 30 causes only those portions of the web 19 where it is disposed to adhere tightly to the creping surface 39.

The web 19 is carried on the surface of the creping drum 39 for a distance sufficient to heat the bonding material enough to tightly adhere the web 19 to the creping drum 39 and dry the web, if necessary, and then is removed therefrom by the action of the creping doctor blade 40, performing a first controlled pattern crepe on the web 19.

The web 19, having been controlled pattern creped, is pulled from the creping doctor blade 40 through a pair of driven pullrolls 41 and then is advanced about turning rolls to a second material-application station 32, illustrated by smooth rubber transfer roll 34, rotogravure roll 35 and pan 36 containing second bonding material 37. This bonding material is also applied to the web 19 in a pattern arrangement which is not necessarily the same as that of the first bonding material.

After applying the second bonding material to the web 19, the web 19 is pressed into contact with a second creping surface 39A by press roll 38A. The web 19 is carried on the surface of the second creping drum 39A for a distance and then removed therefrom by the action of a second creping doctor blade 40A, performing a second controlled pattern creping operation on the web 19.

The web 19 is then pulled from the creping doctor blade 40A with a second set of driven pull-rolls 41A and then may be optionally advanced through a curing or drying station 42 of the same type described for FIG. 2. The web 19 is then wound into a parent roll 43 in the same manner as described for FIG. 2.

FIG. 4 illustrates another apparatus for performing another alternative method of the invention. The apparatus illustrated in FIG. 4 is the same as the apparatus illustrated in FIG. 3 up through the second material-application station 32, after which, in the FIG. 4 apparatus, the web 19, having bonding material disposed on both sides 31 and 33, is passed through the curing or drying station 42 without a second controlled pattern creping. The web 19 is then wound into parent roll 43, in the same manner as in FIGS. 2 and 3.

Referring to the three apparatus illustrated in FIGS. 2, 3, and 4, some variation is permissible in the bonding-material application stations. For example, the application stations could be arranged to print the bonding material directly on the creping drum just prior to placing the web 19 into contact with it. Other variations could also be practiced as well, keeping in mind that each station in each apparatus must apply bonding material to the opposite side of the web as the other station in the same apparatus. Also, the bonding material application station can be provided by means other than rotogravure rolls, such as flexigraphic means and spraying means including the use of silk screening.

The pattern of bonding material applied to the web 19 can be on either side, and must be on one side, in any form of fine lines or fine areas which leaves a substantial portion of the surface of the web 19 free from bonding material. Preferably, the pattern should be such that the bonding material occupies between about 15 percent and about 60 percent of the total surface area of the web, leaving between about 40 percent and about 85 percent of each surface of the web free from bonding material in the finished web product. The patterns disclosed in U.S. Pat. Nos. 3,047,444; 3,009,822; 3,059,313; and 3,009,823 may be advantageously employed. Some migration of bonding material occurs after printing, and the pattern of the rotogravure roll is chosen accordingly. Thus, the bonding material penetrates partially through the web 19 and in all directions of the plane of the web 19. To practice the most preferred form of the invention, migration in all directions in the plane of the web should be controlled to leave areas of between about 50 percent and about 75 percent of the finished web surface free from bonding materials.

It has been found to be particularly desirable when the web consists principally of papermaking fibers to apply the bonding material in a recticular pattern so the bonding material forms a net-like web of strength through the surface of the web. It is well known that papermaking fibers generally have a length less than about one-fourth inch and normally have a predominent fiber length less than about one-sixteenth of an inch. Therefore, where strength is to be primarily imparted to a sheet by bonding material, as in the preferred form of the present invention, instead of through interfiber bonds of the type conventionally utilized in papermaking, it is important that there be a continuous interconnection of at least some of the fibers by the bonding material throughout the entire web. If the pattern of bonding material is in the form of parallel lines, bars, or other forms of discrete areas, the web will lack substantial strength unless such discrete areas are spaced apart by distances less than the average fiber lengths. However, when the pattern of adhesive is reticular or net-like in configuration, the interconnected lines of bonding material application provide a network of strength even where substantial areas are defined between the lines of bonding material application as unbounded web portions.

The bonding material utilized in the process and product of the preferred form of the present invention must be capable of several functions, one being the ability to bond fibers in the web to one another and the other being the ability to adhere the bonded portions of the web to the surface of the creping drum. In general, any material having these two capabilities may be utilized as a bonding material, preferably if the material can be dried or cured to set it. Among the bonding materials which are capable of accomplishing both of these functions and which can be successfully used are acrylate latex rubber emulsions, useful on unheated as well as heated creping surfaces; emulsions of resins such as acrylates, vinyl acetates, vinyl chlorides, and methacrylates, all of which are useful on a heated creping surface; and water soluble resins such as carboxy methyl cellulose, polyvinyl alcohol, and polyacrylamide. However, in other instances, the bonding material may comprise a mixture of several materials, one having the ability to accomplish interfiber bonding and the other being utilized to create adherence of the web to the creping surface. In either instance, the materials are preferably applied as an integral mixture to the same areas of the web. Such materials may also comprise any of the materials listed above, mixed with a low molecular weight starch, such as dextrin, or low molecular weight resin such as carboxy methyl cellulose or polyvinyl alcohol. It should be noted here that when practicing the form of the invention which does not require two controlled pattern crepes, one of the bonding materials can be chosen for its ability to bond fibers together only.

In forming the preferred product of the present invention, elastomeric bonding materials are employed which are basically materials capable of at least 75 percent elongation without rupture. Such materials generally should have a Young's modulus by stretching which is less than 25,000 psi. Typical materials may be of the butadiene acrylonitrile type, or other natural or synthetic rubber latices or dispersions thereof with elastomeric properties, such as butadiene-styrene, neoprene, polyvinyl chloride, vinyl copolymers, nylon, or vinyl ethylene terpolymer. The elastomeric properties may be improved by the addition of suitable plasticizers with the resin.

The amount of bonding material applied to the webs can be varied over a wide range and still obtain many of the benefits of the invention. However, because the preferred products of the invention are absorbent wiper products, it is desirable to keep the amount of bonding material to a minimum. In the preferred forms of the invention, it has been found that from about 3 percent to about 20 percent of total bonding material (based upon dry fiber weight of the finished web product) is satisfactory, and from about 7 to 12 percent is preferred.

The creping drum 27 may in some instances comprise a heated pressure vessel such as a Yankee dryer, or in other instances may be a smaller roll and may be unheated. It is characterized by an extremely smooth, polished surface to which the bonding material applied to the web adheres. The necessity for heating depends upon both the characteristics of the particular bonding material employed and the moisture level in the web. Thus, the bonding material may require drying or curing by heating in which case the creping drum may provide a convenient means to accomplish this. Or, the moisture level of the web being fed to the creping drum may be higher than desired, and the creping drum may be heated to evaporate some of this moisture. It should be noted here that some bonding material may not require the curing or drying step effected by the curing or drying station 42 in FIGS. 2, 3, and 4 or drying station 29 in FIG. 2.

The amount of creping applied to the web during each controlled pattern creping step may be varied and still obtain benefit from the invention. However, it has been found that from about 3 to about 20 percent per creping operation produces a desirable product, and from about 7 to about 12 percent per creping operation is preferred.

Figure 6:
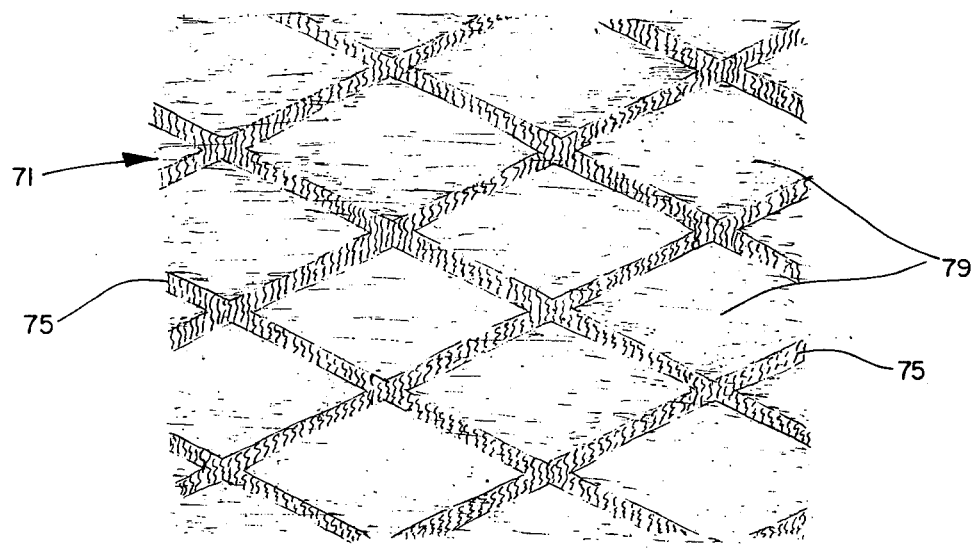
FIG. 6 is a greatly enlarged planar view of a portion of one side of another form of sheet material of the invention to which bonding material was applied in the preferred form of pattern.

FIG. 5 illustrates one form of sheet material of the present invention in which the bonding material is disposed in a plurality of closely spaced discrete areas. FIG. 6 illustrates another form of sheet material of the present invention in which the bonding material is applied in a reticular net-like pattern. Both of these figures show only one surface of the sheet 71 to which the bonding material 75 has been applied, but the opposite sides of the sheet contain similar areas where bonding material has been applied. In some embodiments, it might be desirable to apply a bonding material in discrete areas on one side of the web and in a reticular net-like pattern on the other side.

Figure 7:
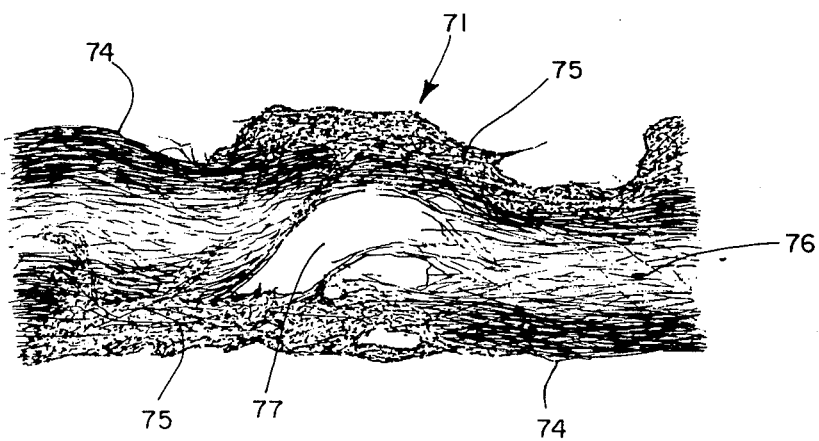
FIG. 7 is a greatly enlarged view of a portion of the sheet material of the invention in a cut-away view through the web of the invention.

FIG. 7 illustrates a cross-sectional view of a sheet similar to that illustrated in FIG. 6. FIG. 7 was drawn from a photomicrograph of an actual sheet of the present invention which was made from a slurry mixture of 90 percent unrefined dry lap wood pulp and 10 percent 6 mm. long 1.5d. rayon fibers formed into a base sheet having a basis weight of 37 lbs./2,880 ft.$^2$. The base sheet was formed on an apparatus similar to that illustrated in FIG. 1 and was processed by the method of the invention on an apparatus similar to that illustrated in FIG. 3. The finished product had a basis weight of 50 lbs./2,880 ft.$^2$ and a bulk of 0.720 inches per 24 sheets. The sample was stained to distinguish the fibers from the bonding material and cut in the machine direction. The sample was magnified 50 times in the photograph, and the drawing is to the same scale.

Still referring to FIg. 7, the sheet material 71 displays surface regions 74 and a central core region 76, all in an integral web. The surface regions are generally undulating and have bonding material 75 disposed at spaced locations. The bonding material 75 bonds at least some of the fibers together to form bonded web portions located throughout the surface regions 74. The unbonded web portions are generally held together only by bonds which are formed on the web prior to application of the bonding material and, as pointed out above, preferably have very low interfiber bonding strength.

It is preferred that the bonding material migrates through only a minor portion of the thickness of the web. It is important to the invention that the bonding materials which create the strong surface regions do not generally extend all the way through the web, whether it is bonding material from one surface of the web extending through to the other surface, or bonding material from one surface extending into contact with bonding material from the other surface. It is the portions of the web which do not have the bonding material applied in the steps of the invention that are most greatly affected by the controlled pattern creping to form the soft, absorbent central core region. The best way to assure that excessive penetration of the bonding materials does not occur is to limit penetration of the bonding material on either side of the web to no more than about 40 percent through the thickness of the finished web product. More preferably the bonding material extends less than about 30 percent through the thickness of the web. In some embodiments, the penetration of the bonding material on one side of the web may be more than 40 percent, up to 60 percent, as long as the penetration of the bonding material on the other side of the web is not so great as to interconnect the bonding materials from both sides of the web. Also, deeper penetration, up to 60 percent on both sides, can be practiced if the pattern on the two sides are so chosen or so placed with respect to each other that connection of bonding materials from the two sides does not generally occur.

However, it is also highly preferable in order to obtain the greatest advantage of the invention, that the bonding material penetrates a significant distance into the web from the surface, at least 10 percent of the web's thickness and more preferably at least 15 percent. This degree of penetration will assure creation of the desirable properties in the surface regions as described above.

Migration and penetration of the bonding material is influenced, and thus can be controlled, by varying the basis weight of the web itself and by varying the pressure applied to the web during application of the bonding material thereto, since wicking through the web is enhanced when the fibers are compacted closely together. Also, changing the nature of the bonding material and its viscosity will affect migration and penetration of the bonding material. In addition varying the amount of time between application of the bonding material and setting or curing of the material will affect penetration, as well as varying base web moisture content and pressure roll loading at the dryer. A determination of the exact required conditions is easily within the skill of a papermaker without undue experimentation once he decides which bonding material he wishes to use and how much penetration he wishes.

It should be noted here that at occasional locations, some of the bonding material will penetrate further or less than desired due to inherent process and base web deviations. The critical and preferred ranges of bonding material penetration and migration expressed herein, therefore, refers only to the great majority of the web and does not preclude the possibility of occasional variances. It may even be desirable in some cases, to purposely cause deeper penetration of the bonding material at selected locations occupying less than about 5 percent of the surface area of the finished web to tie the surfaces of the web together without unduly diminishing the absorbency and bulk of the central core region. Such deeper penetrations can be caused by deeper engraved lines or dots at spaced locations on the rotogravure roll. Such practices are to be considered within the scope of the invention.

FIG. 7 illustrates a web produced by an apparatus similar to that illustrated in FIG. 3. That is, the web would have been subjected to control pattern creping on both sides. However, the web produced by the method and apparatus of FIG. 2 or FIG. 4 would be somewhat similar to that illustrated in FIG. 7, one difference being that the double controlled pattern creped product would have a greater number and greater size split areas 77 in the central region of a web having the same degree of creping and from the same base web. One of the surfaces in the web illustrated in FIG. 7 is flatter than the other surface. The flatter surface was the surface adhered to the creping surface during the last controlled pattern crepe of the web. Such surface configurations are somewhat typical, although other variations might occur.

This effect of split areas 77 is caused in part by localized shrinkage of the bonded areas due to the creping action. Thus, the creping of the bonded areas causes the areas between those shrunken areas to be compressed in the plane of the web in the direction of shrinkage and forced out of the plane of the web to allow for the greater dimensions of the regions not having bonding material, which are not affected by the creping operation, at least not to the same extent. At the same time, the fibers within the central region 76 of the web are greatly pulled apart from each other, creating the split regions 77 throughout the web, in addition to the general reduction in fiber concentration in the core region 76. It is this action which greatly enhances the bulk and softness of the product in addition to substantially increasing its absorbency. Furthermore, the heavier fiber concentration in the surface regions 74 provides good wipe-dry properties, while the bulkier, less concentrated fibers in the central region provide good absorbtive capacity. All of these desired properties are better imparted to both sides of the web when practicing the preferred method of the invention.

Because the portions of the web surface not having bonding material are subjected to compression by shrinkage of the bonded regions in that surface, they permit elongation of the web in both the cross-direction and the machine direction due to the ability of the arches to withdraw when the sheet is subjected to tension. Therefore, the resulting sheet material possesses substantial stretch in all directions in its plane. In this manner, the method of the invention can provide a simple and convenient process for creating multidirectional stretch in a web without the complexity and difficulty in the prior art methods discussed above such as creping the web twice in different directions. To illustrate, sheet materials of the present invention typically have stretch in the machine direction up to about 40 percent and stretch in the cross-machine direction up to about 25 percent.

Furthermore, when portions of the web surface not having bonding material are compressed, the fibers are forced closer together. The closer fibers decrease the sizes of the openings between the fibers and, therefore, increase the capillary action of moisture drawn into the web. This results in better wipe-dry properties of the web. This is especially beneficial in dry formed fibrous webs and aqueous formed webs of reduced interfiber bonding, where the fibers generally are not as tightly compacted upon being formed into a web as might be desired for wipe-dry properties.

The creping action on the web preferably separates fibers within its central region 76 to form split regions 77. Sufficient interfiber bonds are left intact in groups of interconnecting fibers to bond the two surface regions 74 to the central core regions 76 and to each other. These interfiber bonds are either papermaking bonds or intertwining of relatively longer fibers, or both. Additional strength interconnecting the two surface regions together can be obtained in webs formed from aqueous slurries of papermaking fiber, if desired, by the addition of longer synthetic fibers into the web. These fibers add strength by occasionally extending from one area containing bonding material on one surface to another area containing bonding material on the opposite surface of the web, in addition to some strength obtained by intertwining with other long fibers in the central core region of the web.

Referring back to FIG. 5 and FIG. 6, the reticular bonding pattern illustrated in FIG. 6 has an additional feature over the pattern in FIG. 5. Since the pattern of the bonded areas is net-like rather than discrete, the compression effect in the unbonded web portions is even further enhanced, resulting in even greater machine direction and cross-machine direction stretch in the resulting product. In addition, a higher percentage of the web may be unbonded relative to a product of the type shown in FIG. 5 with comparable web strength. Thus, since the bonding pattern in this embodiment is substantially continuous and interconnected, the unbonded web portions between the lines of bonding 75 can be much larger and still provide the strength required. This is due to continuous lines of adhesively interconnected fibers which are distributed over the surface to provide a net-like web of strength.

To further illustrate the invention, the following working examples are given. They are only illustrations, and are not to be taken as limiting the invention beyond that which is described in the specification and claims.

EXAMPLE I

A base web was conventionally formed on conventional papermaking equipment from a pulp slurry which consisted of 90 percent bleached sulfate soft wood (dry lap) and 10 percent uncrimped regular finish rayon fibers one-fourth inch long by 1.5 denier. To reduce the amount of interfiber bonding of the papermaking fibers, 0.4 percent (by weight based upon dry fiber weight) of QUAKER 2003 was added to the slurry. (QUAKER 2003 is a cationic, high molecular weight, quaternized imadazoline available from Quaker Chemical Corporation, Conshohocken, PA.) The base web was then adhered to a Yankee dryer using 0.5 percent (by weight) SANDOFIX SWE liquid (manufactured by Sandoz and consisting of an aqueous solution of a condensation product obtained by heating together one mol of dicyandiamide with one mol of diethylene triamine, dissolving the condensation product at 20°C. in water, neutralizing the solution with concentrated hydrochloric acid at 20°C. and filtering). The creping adhesive was sprayed uniformly over the creping surface before application of the web. The base web was creped from the Yankee dryer at approximately 86 percent dry and was further dried on conventional after dryers to more than 92 percent dry. The general physical properties of the base web were:

| | |
|---|---|
| MD tensile | 25oz./in |
| MD stretch | 5.6% |
| CD tensile | 15oz./in |
| CD stretch | 2.8% |
| CD wet tensile | 1.7oz./in. |
| Basis weight | 36.7lbs./2880sq.ft. |
| Bulk | 250 mils/24 sheets |
| Absorbency | (.1cc H₂O) — 3.9 seconds. |

The base web was then subjected to the following steps of the invention. Bonding material was applied to the first side of the web by passing the web through a nip formed by a patterned gravure roll and a smooth rubber press roll. The gravure roll was 12 in. in diameter and covered by an overall elongated diamond pattern of 80 mils × 60 mils (the longer dimension aligned in the machine direction of the web) and a pattern repeat length of 0.130 in. The engraved lines of the diamond pattern were 0.010 in. wide and approximately 70 microns deep and occupied approximately 25 percent of the peripheral surface area of the gravure roll. The press roll was 9 ¼ in. in diameter with a five-eighths in. thick silicone cover (hardness of 55 Shore "A" Durometer).

The bonding material applied to the web at this bonding material application station was a water emulsion of AIRFLEX 120 at 35 percent solids, 0.5 percent ammonium chloride and 1 percent NOPCOTE DC-173 defoamer (all percentages are based on total solids). AIRFLEX 120 is a self-crosslinking vinylethylene terpolymer emulsion produced by Air Products and Chemicals of Wayne, PA, and used primarily as a nonwoven binder. It has maximum solids of 52 percent (Cenco moisture balance); viscosity of 800–1200 cps (Brookfield Viscometer, Model LVF, at 60 rpm and 77°F); pH of 5.0–6.0; maximum 0.5 percent residual monomer; anionic surfactant system; average particle size of 0.1–0.2 microns; density of 8.72 lbs./gal; 80 to 90 percent Benzene insolubles; Tg (glass transition) of −20°C. (differential thermal analysis); ultimate strength of about 600 psi; and ultimate elongation of 285 percent (measured on film strips cured using 1 percent NH₄Cl catalyst for 5 minutes at 300°F). NOPCOTE DE-173 is an anionic white emulsified fatty glyceride liquid de-foamer manufactured by Diamond Shamrock Chemical Company of Morristown, NJ, and having the properties of 52 percent solids, density of 8.0 lbs./gal., pH(2%) of 9.2, and viscosity of 200 cps (Brookfield at 100 rpm). The general properties of the bonding material fluid upon being applied to the web was: viscosity of 20 centipoise at 25° C; pH of 4.5, and specific gravity of 1.035 at 70°C. The pressure in the printing nip was controlled at 100 psi average. The average basis weight of the sheet was increased by 15 percent of which 5 percent was due to the non-volatile constituents of the bonding material fluid.

The web was then pressed against a 4-foot diameter cast iron creping drum with the side of the web having bonding material disposed upon it placed against the creping drum. The pressing was performed by a 9 ¼ in. diameter rubber press roll having a five-eighth in. thick silicone cover and exerting an average pressure of 100 psi. The creping drum was steam heated to a surface temperature of 220°F and rotated at a surface speed of 400 feet per minute. As the sheet was pressed to the drum, the average dryness of the web was 79 percent and upon being removed from the drum the average dryness was 95 percent. The web was creped from the drum surface by a conventional creping doctor blade set at a creping shelf angle of 20° above the radial line at the point of contact. The web was taken away from the creping drum by pull-rolls operating at a peripheral speed of 365 feet per minute, resulting in 10 percent shortening of the machine direction of the web ( 10% crepe).

The web was then passed through a second bonding material application station which was identical to the first bonding material application station and where bonding material was applied to the second side of the web. The specifications for the bonding material, the pattern of the gravure roll, and the nip pressure were the same as for the first material application station.

The web was then pressed against a second 4-foot diameter creping dryer with the second side of the web against the dryer. The conditions for which the web was pressed against the second dryer were identical to conditions at the first dryer. The second dryer was rotated at a surface speed of approximately 365 feet per minute. The sheet was again taken from the creping blade by a similar set of pull-rolls, imparting 10 percent crepe to the web.

The web was then passed over conventional steam heated cans at an average temperature of 305°F for 12 seconds of contact to cure or set the bonding material in the web.

The finished web represents a product of the invention, and had the following general physical properties:

| | |
|---|---|
| MD Tensile | 30.6oz./in |
| MD Stretch | 34.4% |
| CD Tensile | 21.6oz./in |
| CD Stretch | 18.8% |
| CD Wet Tensile | 17.0oz./in |
| Basis Weight | 50 lbs./2880sq.ft. |
| Bulk | 720 mils/24 sheets |
| Absorbency | (.1cc H$_2$O) — instantaneous |

EXAMPLE II

The base web was conventionally formed on conventional papermaking equipment from a pulp slurry of 90 percent bleached sulfate soft wood fibers (dry lap) and 10 percent uncrimped regular finish rayon fibers one-fourth inch long 1.5 denier, along with 0.4% QUAKER 2003 to reduce interfiber bonding. The web was adhered to a Yankee dryer using 0.5 percent SANDOFIX SWE applied uniformly over the web surface and creped at approximately 50 percent dryness. The web was dried further by conventional after dryers to more than 92 percent dryness. The physical properties of the base web at this point were:

| | |
|---|---|
| MD Tensile | 25.1 oz./in |
| MD Stretch | 4.9% |
| CD Tensile | 15.4 oz./in |
| CD Stretch | 1.6% |
| CD Wet Tensile | 2.0 oz./in |
| Basis Weight | 38.7 lbs/2880 sq.ft. |
| Bulk | 274 mils/24 sheets |

Bonding material was applied to the first side of the base web by passing the web through a nip formed by a patterned gravure roll and an elastomer roll of 5 in. diameter having a one-half inch thick neoprene cover of a hardness of 55 Shore "A" Durometer and a further cover of 0.020 in. thick teflon sleeve. The gravure roll was 5 in. in diameter and covered by an overall diamond pattern of 80 mils × 60 mils (the long dimension aligned in the machine direction of the web) and a pattern repeat length of 0.130 inches. The engraved lines of the diamond were 0.009 inches wide and approximately 65 microns deep. The engraved lines of the diamond pattern occupied approximately 23 percent of the surface area of the gravure roll.

The bonding material formulation used was a water emulsion of AIRFLEX 120 at 38 percent solids, 0.50 percent ammonium chloride and 1 percent NOPCOTE DC-173 de-foamer. (percentages based on the total solids). The general properties of the bonding material as applied to the web was 20 centipoise at 25°C, pH of 4.5, and specific gravity of 1.035 at 70°F. The pressure in the printing nip was controlled at 120 psi average, and the average basis weight of the sheet was increased by 15 percent of which 5 percent was due to nonvolatile constituents of bonding material.

The printed web was then pressed on a 3-ft. diameter cast iron creping drum by a 6 in. diameter elastomer roll having a one-half in. thick neoprene cover and 0.020 in. thick teflon sleeve over the neoprene cover. The average nip pressure at the creping drum was 100 psi. The creping drum was electrically heated to a surface temperature of 175°F, and the drum surface speed was 100 feet per minute. The average dryness of the web approaching the drum was 79 percent and the average dryness of the web leaving the drum was 95 percent. The web was creped from the drum surface by a conventional creping doctor blade set at a creping shelf angle of 12 degrees above the radial line at the point of contact. The web was taken from the creping blade by pull-rolls rotating at a peripheral speed of 90 feet per minute, resulting in 10 percent shortening of the machine direction of the web (10 percent crepe).

The web was then fed through 16 feet of a Fostoria infrared oven having 64 quartz lamps (rating 2,500 watts per lamp at 480 volts) of which only 12 of the lamps were operated at 480 volts and 40 other lamps were operated at 250 volts. All of the lamps were backed by gold reflectors.

The web was then passed again through the previously described bonding material application station, creping drum, and infrared oven in an identical manner to the first time, except that the bonding material was applied to the second side of the web. The resulting web was a product of the invention and had the following general properties:

| | |
|---|---|
| MD Tensile | 51.2 oz./in |
| CD Tensile | 30.9% |
| CD Tensile | 31.9 oz./in |
| CD Stretch | 17.7% |
| CD Wet Tensile | 19.5 oz./in |
| Basis Weight | 51.7 lbs./2880 sq. ft. |
| Bulk | 725 mils/24 sheets |
| Absorbency | (.1cc H$_2$O) — instantaneous |

EXAMPLE III

The base web was conventionally formed on conventional papermaking equipment from a pulp slurry of 100 percent bleached sulfate soft wood fibers (dry lap), into which was added 0.4 percent QUAKER 2003 to reduce interfiber bonding. The web was adhered to a Yankee dryer using 0.5 percent SANDOFIX SWE applied uniformly over the web surface and was creped at approximately 85 percent dryness. The sheet was further dryed by conventional after dryers to more than 92 percent dryness. The physical properties of the base web at this point were as follows:

| | |
|---|---|
| MD Tensile | 20 oz./in |
| MD Stretch | 5.6% |
| CD Tensile | 12 oz./in |
| CD Stretch | 2.4% |
| CD Wet Tensile | 1.2 oz./in |
| Basis Weight | 27 lbs./2880 sq. ft. |
| Bulk | 190 mils/24 sheets |

The base web was then passed through a bonding material application station consisting of a nip formed by a patterned gravure roll and an elastomer roll of 5 in. diameter having a one-half in. thick neoprene cover (hardness of 55 Shore "A" Durometer) and further covered by a 0.020 inch thick teflon sleeve. The gravure roll was 5 inches in diameter and covered by an overall diamond pattern of 60 × 80 mils (the shorter dimension of the diamond aligning with the machine direction of the web) and a pattern repeat length of 0.110 inches. The engraved lines of the diamond were 0.0085 inches wide and approximately 50 microns deep. The engraved lines of the diamond pattern occupied approximately 22 percent of the surface area of the gravure roll.

The bonding material formulation was a water emulsion of AIRFLEX 120 at 42 percent solids, 0.5 percent ammonium chloride and 1 percent NOPCOTE DC-173 de-foamer (percentages based on the total solids). The conditions of the bonding material were 60 centipoise at 25°C, pH of 4.5, and specific gravity of 1.035 at 70°F. The pressure in the printing nip was controlled at 120 psi average, and the average basis weight of the sheet was increased by 15 percent, of which 5 percent was due to the non-volatile constituents of the bonding material.

The web was then pressed against a 3-ft. diameter cast iron creping drum by a 6 in. diameter elastomer press roll having a one-half in. thick neoprene cover and 0.020 inch thick teflon sleeve. The average nip pressure was 100 psi. The creping drum was electrically heated to a surface temperature of 175°F, and the drum surface speed was 100 feet per minute. The average dryness of the web as it approached the drum was 79 percent, and the average dryness of the web upon leaving the drum was 95 percent.

The web was creped from the drum surface by a conventional creping doctor blade set at a creping shelf angle of 5° above the radial line at the point of contact. same print bonding application station, creping drum, and infrared oven, applying the identical process to the second side of the web.

The resulting web was a product of the invention and had the following general properties:

| | |
|---|---|
| MD Tensile | 23.2 oz./in |
| MD Stretch | 39.3% |
| CD Tensile | 15.4 oz.in |
| CD Stretch | 23.0% |
| CD Wet Tensile | 10.4 oz./in |
| Basis Weight | 37 lbs./2880 sq. ft. |
| Bulk | 486 mils/24 sheets |

Practice of the invention enables production of a product having many superior properties over the prior art. To illustrate, two products were made from the same base web. One of the products was made practicing the method of the instant invention where bonding material was applied to one side of the web and the web was subjected to controlled pattern creping from a drum, bonding material was applied to the second side of the web, and the web was subjected to a second controlled pattern creping. The other product was formed according to the method described in U.S. Pat. Application No. 156,327, in which bonding material was applied to only one side of the web and the web was subjected to creping only once. The total amount of bonding material applied to both products and the total amount of creping to which each web was subjected were equal for both products produced. The base web from which the two products were produced and the two products had the following general properties:

TABLE I

| Properties | Base Web | Product of the Invention | Improvement | Product of the 156,327 Invention | Improvement |
|---|---|---|---|---|---|
| MD Tensile (oz./in.) | 36.2 | 47.7 | 32% | 36.5 | 1% |
| MD Stretch (%) | 7.2 | 40.5 | 463% | 37.2 | 417% |
| CD Tensile (oz./in.) | 19.7 | 30.2 | 53% | 23.8 | 21% |
| CD Stretch (%) | 2.7 | 17.7 | 556% | 11.5 | 326% |
| MD Wet Tensile (oz./in.) | 10.3 | 31.4 | 205% | 20.9 | 103% |
| CD Wet Tensile (oz./in.) | 4.6 | 17.6 | 283% | 12.4 | 170% |
| Bulk (mils/24 sheets) | 255 | 632 | 148% | 507 | 99% |
| Basis Weight (lbs./2880 ft.$^2$) | 41.0 | 55.6 | 36% | 52.9 | 29% |
| Absorbency (.1CCH$_2$O) (sec.) | 4.0 | inst. | — | inst. | — |
| H$_2$O Capcity (%) | 338.6 | 569.8 | 68% | 449.2 | 33% |
| Rub Resistance 1st Side of Web (Cycles) | — | 1000+ | — | 96 | — |
| Rub Resistance 2nd side of web (Cycle) | — | 1000+ | — | 1000+ | — |

The web was taken from the creping blade by pull-rolls rotating at a peripheral speed of 90 feet per minute, resulting in a 10 percent shortening in the machine direction of the web (10 percent crepe).

The web was then fed through 16 feet of a Fostoria infrared oven having 64 quartz lamps (rating 2,500 watts per lamp at 480 volts) of which only 52 lamps were employed, 12 at 480 volts and 40 at 250 volts. All of the lamps were backed by gold reflectors.

The web was then passed a second time through the

The rub resistance was determined in an abrasion tester manufactured by United States Testing Company of Hoboken, NJ, Model No. 4769 (Serial Number 8306). The procedure followed was to clamp a wet sample to a 6 inch diameter turntable and place a 1½ inch smooth steel head on top of the sample. The turntable was oscillated 3½ inches while it was turned. The number of revolutions of the turntable were counted to sample failure. If failure did not occur at 1000 cycles, the test was stopped.

It is apparent from the comparison of these properties that practicing the invention enables with equal amounts of creping and equal amounts of bonding material production of greater bulk, greater strength, greater stretch, greater water holding capacity and greater abrasion resistance for both sides of the web than possible by practicing the 156,327 invention. It is also apparent from Table I that practice of the instant invention offers an excellent opportunity to increase wet strength of the web.

The product of the invention compares favorably with conventional multi-ply towel products of the prior art. To illustrate, a commercially purchased product produced according to the method described in U.S. Pat. No. 3,414,459 was found to have the following properties:

TABLE II

| Properties | Product of the Invention | Convention Multi-ply Product | |
|---|---|---|---|
| MD Tensile (oz./in.) | 47.7 | 42 | |
| MD Stretch (%) | 40.5 | 12 | |
| CD Tensile (oz./in.) | 30.2 | 20 | |
| CD Stretch (%) | 17.7 | 6.7 | |
| MD Wet Tensile (oz./in.) | 31.4 | 10.5 | |
| CD Wet Tensile (oz./in.) | 17.6 | 5.1 | |
| Bulk (mils/24 sheets) | 632 | 340 | |
| Basis Weight (lb./2880 ft.²) | 55.6 | 26 | |
| Absorbency (.1cc H₂O) | Inst. | 1.0 | second |
| Rub Resistance 1st Side (Cycles) | 1000+ | 158 | |
| Rub Resistance 2nd Side (cycles) | 1000+ | 124 | |

From a consideration of the foregoing properties it is apparent that the product of the invention compares very favorably with the conventional two-ply prior art towel products in the amount of bulk per basis weight and absorbency. Furthermore, the product of the invention is superior in abrasion resistance to the conventional two-ply prior art products.

What is claimed is:

1. Fibrous sheet material comprising a single-ply laminate-like web of fibers having a predominate length of less than one-fourth inch,
   the web having a basis weight of from about 20 to about 100 pounds per ream of 2,880 square feet,
   the web having an undulating disposition due to creping of the web and having first and second strong, abrasion-resistant, laminate-like surface regions interconnected by a soft, absorbent, laminate-like central core region,
   the central core region generally having less fiber concentration than the surface regions to provide greater bulk, softness and absorbency to the web,
   each surface region having bonding material disposed throughout to bond the fibers in that surface region together into a strong network, the bonding material in each surface region extending from about 10 percent to about 60 percent through the thickness of the web and being substantially unconnected to the bonding material extending into the web from the other side of the web,
   the bonding material in the first surface region being disposed in a fine, spaced-apart pattern occupying from about 15 percent to about 60 percent of the surface area of the finished web product on the first surface region side of the web, and
   the areas in the first surface region where the bonding material is disposed being finely creped.

2. Fibrous sheet material comprising a single-ply laminate-like web of randomly oriented fibers, having a predominate length of less than one-fourth inch,
   the web having a basis weight of from about 20 to about 100 pounds per ream of 2,880 square feet, and having an undulating disposition due to creping of the web,
   the web having two strong, abrasion-resistant, laminatelike surface regions interconnected by a soft absorbent, laminatelike central core region,
   the central core region generally having less fiber concentration than the surface regions to provide greater bulk, softness and absorbency to the web,
   each surface region having bonding material disposed in a fine spaced apart pattern throughout to bond the fibers in that surface region together into a strong network, the bonding material disposed throughout the surface regions occupying from about 15 percent to about 60 percent of the surface area of the finished web product on each side of the web, and the bonding material being disposed into the web to a depth of from about 10 percent to about 40 percent of the finished web product thickness on each side of the web, and
   the areas in at least one of the surface regions where the bonding material is disposed being finely creped.

3. Fibrous sheet material recited in claim 2, wherein the bonding material is an elastomeric material and the areas in both of the surface regions where the bonding material has been disposed are finely creped.

4. Fibrous sheet material recited in claim 3, wherein the web is characterized overall by very low interfiber bonding strength except that created by the bonding material in the areas where the bonding material is disposed, and the central core region has split portions generally throughout.

5. Fibrous sheet material recited in claim 4, wherein the web is formed from an aqueous slurry of principally lignocellulosic fibers.

6. Fibrous sheet material as recited in claim 5, wherein the lignocellulosic fibers have been treated with a chemical debonding agent to reduce their interfiber bonding capacity.

7. Fibrous sheet material recited in claim 5, wherein the web has been formed under conditions of reduced pressing until the web was substantially dry to reduce its interfiber bonding strength by reducing the amount of interfiber contact.

8. Fibrous sheet material recited in claim 5, wherein the web has been creped uniformly over the entire surface prior to application of the bonding materials in a fine pattern, whereby interfiber bonds are disrupted and broken by the creping action.

9. Fibrous sheet material as recited in claim 5, wherein all of the fibers are lignocellulosic fibers.

10. Fibrous sheet material recited in claim 5, wherein from about 10% to about 15% of the total fiber mixture comprise relatively long fibers uniformly distributed throughout the web.

11. Fibrous sheet material recited in claim 5, wherein the bonding material disposed in each surface region extends into the web from about 15 percent to about 30 percent of the web thickness.

12. Fibrous sheet material recited in claim 11, wherein the bonding material is disposed in each surface region of the web in a discontinuous intermittent pattern so as to define a pattern of discrete areas having bonding material surrounded by areas having no bonding material.

13. Fibrous sheet material recited in claim 11, wherein the bonding material is disposed in each surface region of the web in a continuous reticular pattern so as to define a discontinuous intermittent pattern of discrete areas having no bonding material surrounded by areas having bonding material.

14. Fibrous sheet material recited in claim 13, wherein the bonding material is disposed in each surface of the web to occupy an area of from about 25 percent to about 50 percent of the surface area of the web.

15. Fibrous sheet material recited in claim 14, wherein the basis weight of the web is from about 25 to about 60 pounds per ream of 2880 square feet.

16. Method of forming a single-ply laminate-like fibrous web, comprising the steps of:
 a. providing a fibrous web of fibers having a predominate length of less than one-fourth inch and having a basis weight of from about 16 to about 80 pounds per ream of 2,880 square feet;
 b. applying to the first side of the web a first bonding material which penetrates from about 10 percent to about 60 percent through the thickness of the finished web product and forms bonded web portions in which fibers are bonded together by the bonding material to form a strong, abrasion-resistant laminate-like surface region;
 c. applying to the second side of the web a second bonding material in a fine, spaced-apart pattern arrangement which covers between about 15 percent and about 60 percent of the surface area of the second side of the finished web product and penetrates from about 10 percent to about 60 percent through the thickness of the finished web product and which does not substantially interconnect with the first bonding material and which forms bonded web portions in which fibers are bonded together by the bonding material to form a strong, abrasion-resistant, laminate-like surface region;
 d. adhering the bonded portions of the second surface of the web to a creping surface by use of the second bonding material; and
 e. creping the web from the creping surface.

17. Method of forming a single-ply laminate-like fibrous web comprising the steps of:
 a. providing a web having a basis weight of from about 16 to about 80 pounds per ream of 2880 square feet of randomly oriented fibers having a predominent length of less than one-fourth inch;
 b. applying to the first side of the web first bonding material in a fine spaced-apart pattern arrangement which covers between about 15 percent and about 60 percent of the surface area of the finished web product and penetrates into the web to a depth of from about 10 percent to about 40 percent of the thickness of the finished web product and which forms bonded web portions in which fibers are bonded together by the bonding material to form a strong, abrasion-resistant, laminate-like surface region;
 c. applying to the second side of the web a second bonding material in a fine spaced-apart pattern arrangement which covers from about 15 percent to about 60 percent of the surface area of the finished web product and penetrates into the web to a depth of from about 10 percent to about 40 percent of the thickness of the finished web product and which forms bonded web portions in which fibers are bonded together by the bonding material to form a strong, abrasion-resistant, laminate-like surface region;
 d. adhering by use of the bonding material the areas on one side of the web where the bonding material has been disposed to a first creping surface; and
 e. creping the web from the creping surface.

18. The method recited in claim 17, wherein step (a) comprises forming the web under conditions resulting in very low interfiber bonding strength and the bonding material is characterized as an elastomeric material.

19. Method recited in claim 18, wherein steps (d) and (e) are performed before step (c).

20. Method as recited in claim 19, including the steps of:
 f. adhering by use of the bonding material the areas on the second side of the web where the bonding material has been disposed to a creping surface; and
 g. creping the web from the creping surface.

21. Method as recited in claim 20, wherein the web is formed from an aqueous slurry of principally lignocellulosic fibers.

22. Method as recited in claim 21, including the step of treating the lignocellulosic fibers with a chemical debonding agent prior to drying the web to reduce their interfiber bonding capacity.

23. Method as recited in claim 21, including the step of forming the web under conditions of reduced pressing until it is substantially dry, whereby the amount of interfiber contact and interfiber bonding strength is reduced.

24. Method as recited in claim 21, including the step of creping the web over its entire surface prior to step (b) so as to disrupt and break interfiber bonds by the creping action.

25. Method recited in claim 21, wherein the web is formed from all lignocellulosic fibers.

26. Method recited in claim 21, wherein the web includes from 10 percent to 15 percent relatively long fibers.

27. Method recited in claim 21, wherein the bonding material applied to each side of the web penetrates into the web from about 15 percent to about 30 percent of the thickness of the finished web product.

28. Method recited in claim 27, wherein the bonding material is applied to both sides of the web in a discontinuous intermittent pattern so as to define a pattern of discrete areas having bonding materials surrounded by areas having no bonding material.

29. Method recited in claim 27, wherein the bonding material is applied to both sides of the web in a continuous reticular pattern so as to define a discontinuous intermittent pattern of discrete areas having no bonding materials surrounded by areas having bonding material.

30. Method recited in claim 29, wherein the bonding material is applied to each side of the web in a pattern which causes the bonding material to occupy from about 25 percent to about 50 percent of the finished web product surface area on each side.

31. Method recited in claim 30, wherein the basis weight of the web formed in step (a) is from about 22 to about 45 pounds per ream of 2880 square feet.

32. Fibrous sheet material recited in claim 1, wherein the sheet material has a basis weight of from about 20 to 100 pounds per ream of 2880 square feet.

33. Fibrous sheet material recited in claim 2, wherein the total bonding material disposed in both surface regions is from about 3 percent to about 20 percent of the dry fiber weight of the finished web product.

34. Fibrous sheet material recited in claim 2, wherein the total bonding material in both surface regions is between about 7 percent and about 12 percent of the dry fiber weight of the finished web product.

* * * * *

UNITED STATES PATENT OFFICE
CERTIFICATE OF CORRECTION

Patent No. 3,879,257  Dated April 22, 1975

Inventor(s) Victor R. Gentile et al.

It is certified that error appears in the above-identified patent and that said Letters Patent are hereby corrected as shown below:

Column 6, line 61, change "is" to --it--.

Column 14, line 38, change "recticular" to --reticular--.
Column 17, line 56, change "control" to --controlled--.
Column 20, line 35, "70°C" should be --70°F--.
Column 21, line 3 of first table --21.6 oz./in--should be in second column of table.
Column 21, line 29, insert --by--between "long" and "1.5".

Signed and Sealed this

Thirteenth Day of September 1977

[SEAL]

Attest:

RUTH C. MASON  
*Attesting Officer*

LUTRELLE F. PARKER  
*Acting Commissioner of Patents and Trademarks*